United States Patent
Soecknick et al.

(10) Patent No.: US 8,773,149 B2
(45) Date of Patent: Jul. 8, 2014

(54) METHOD FOR OPERATING A WATER SOFTENING SYSTEM HAVING TWO CALIBRATION CHARACTERISTICS AND ASSOCIATED WATER SOFTENING SYSTEM

(75) Inventors: Ralf Soecknick, Kornwestheim (DE); Klaus Neidhardt, Grosserlach (DE); Alexander Haug, Remseck (DE); Siegfried Melcher, Oberstendfeld (DE)

(73) Assignee: JUDO Wasseraufbereitung GmbH, Winnenden (DE)

( * ) Notice: Subject to any disclaimer, the term of this patent is extended or adjusted under 35 U.S.C. 154(b) by 816 days.

(21) Appl. No.: 12/744,918

(22) PCT Filed: Dec. 4, 2008

(86) PCT No.: PCT/DE2008/002011
§ 371 (c)(1),
(2), (4) Date: May 26, 2010

(87) PCT Pub. No.: WO2009/071066
PCT Pub. Date: Jun. 11, 2009

(65) Prior Publication Data
US 2010/0301882 A1    Dec. 2, 2010

(30) Foreign Application Priority Data

Dec. 6, 2007  (DE) .......................... 10 2007 059 058

(51) Int. Cl.
*G01R 27/08*   (2006.01)
(52) U.S. Cl.
USPC .......................................... 324/694; 210/739
(58) Field of Classification Search
USPC .......... 324/210, 691–718; 210/662, 746, 96.1
See application file for complete search history.

(56) References Cited

U.S. PATENT DOCUMENTS 3,003,638 A * 10/1961 Kryzer et al. ................. 210/139
3,676,336 A *  7/1972 O'Brien et al. .............. 210/662

(Continued)

FOREIGN PATENT DOCUMENTS

DE         41 14 380 A1   11/1992
DE        195 12 011 A1   10/1996

(Continued)

OTHER PUBLICATIONS

Webpage published in 2006 by Wayback. http://www.mbhes.com/conductivity_measurement.htm.*

(Continued)

*Primary Examiner* — Arleen M Vazquez
*Assistant Examiner* — Brent J Andrews
(74) *Attorney, Agent, or Firm* — Hacker Daghighian & Martino

(57) ABSTRACT

Two different conversion modes are used for determining the water hardness from the conductivity of raw water in a water softening device dividing an influent raw water volume flow into two partial volume flows and subjecting a partial volume flow to a full softening process and re-uniting the two partial volume flows thereafter again into an admixed water volume flow. A first calibration curve reflects the maximum water hardnesses occurring at different conductivities; it is used for automatically controlling the regeneration of an ion exchange resin. A second calibration curve reflects the average water hardnesses at different conductivities; it is used for controlling the ratios of the two partial volume flows in the admixed water. With the invention, variations in the correlations between conductivity and water hardness may be taken into account in order to optimize regeneration and to minimize the hardness tolerances of admixed water.

13 Claims, 3 Drawing Sheets

(56) References Cited

U.S. PATENT DOCUMENTS

Figure 1:
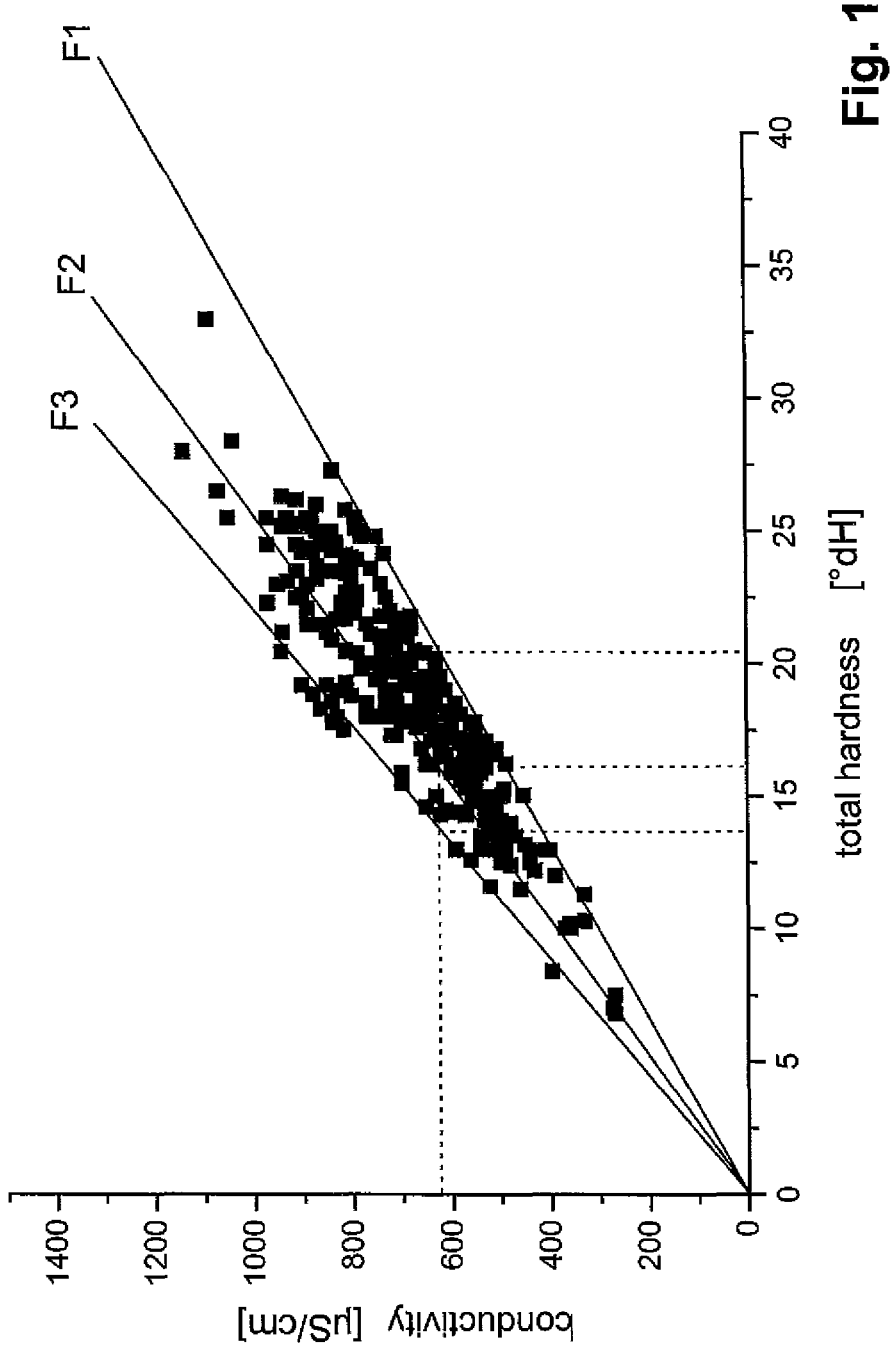

| | | | |
|---|---|---|---|
| 4,018,656 A * | 4/1977 | Rogers et al. | 203/11 |
| 4,275,448 A * | 6/1981 | Le Dall | 700/271 |
| 6,216,092 B1 | 4/2001 | Kong | |
| 6,814,872 B2 | 11/2004 | Rawson | |
| 2002/0017495 A1 * | 2/2002 | Iizuka et al. | 210/739 |
| 2002/0195403 A1 | 12/2002 | Takeda et al. | |
| 2003/0052060 A1 | 3/2003 | Teel, Jr. | |
| 2004/0104175 A1 | 6/2004 | Rawson | |
| 2006/0231500 A1 * | 10/2006 | Speece et al. | 210/739 |
| 2007/0215531 A1 * | 9/2007 | Wawrla et al. | 210/101 |

FOREIGN PATENT DOCUMENTS

| | | | | |
|---|---|---|---|---|
| DE | 19749636 A1 * | 5/1999 | | A47L 15/42 |
| DE | 19841568 A1 | 5/1999 | | |
| DE | 199 18 073 A1 | 10/2000 | | |
| DE | 19940162 A1 * | 3/2001 | | A47L 15/42 |
| DE | 10350884 A1 | 6/2005 | | |
| DE | 10650884 A1 | 6/2005 | | |
| DE | 10 2005 035 951 A1 | 1/2007 | | |
| EP | 0 668 243 B1 | 1/1995 | | |
| EP | 0900765 A2 | 3/1999 | | |
| EP | 1002495 A1 | 5/2000 | | |
| EP | 1080681 A2 | 3/2001 | | |
| JP | S5939382 A | 3/1984 | | |
| JP | 60114952 | 6/1985 | | |
| JP | 2003019480 | 1/2003 | | |
| JP | 2006510489 A | 3/2006 | | |
| RU | 2298529 C2 | 5/2007 | | |
| WO | 2005044736 A1 | 5/2005 | | |
| WO | 2007089070 A1 | 8/2007 | | |
| WO | 2008126967 A1 | 10/2008 | | |

OTHER PUBLICATIONS

Bereschansky, P., et al.: Die Haertebestimmung mittles der elektrischen Leitfaehighkeit im Kiewer Leitungswasser, Medical Microbiology and Immunology, Bd. 106(1926), September.

Ende, Dietmar, Filling with low-salt, alkaline water. Calcium carbonate and corrosion protection according to VDI 2035, SBZ Sanitaer Heizung Klima, Jg. 61 (2006), S. 30-35.

N.N.: Conductivity. Informationsschrift, Veroeffentlichungsdatum und-ort unbekannt.

Bock, Peter, Conductivity (EC) and Total Dissolved Solids (TDS). Informationsschrift der Fa. Euotronik Umwelttechnik, Veroeffentlichungsdatum und-ort unbekannt.

N.N., Conductivity and water hardness, Informationsschrift, nach Angaben der Einsprechenden hinterlegt am May 12, 2006 auf der Internetseite www.kois-corner.de.

Drafts of DIN 19636-100 (Excerpts of Paragraphs 4.3, 4.4, 5.2, 5.3).

Kennliniendiagramm mit eingehaltener DIN-Norm, erstellt von der Einsprechenden basierend 7 auf Daten von 459 Ausgewaehlten Trinkwaessern in Deutschland vom Sep. 2010.

Kennliniendiagramm mit nicht eingehaltener DIN-Norm, erstellt von der Einsprechenden basierend auf Daten von 459 ausgewaehlten Trinkwaessern in Deutschland vom Sep. 2010.

\* cited by examiner

METHOD FOR OPERATING A WATER SOFTENING SYSTEM HAVING TWO CALIBRATION CHARACTERISTICS AND ASSOCIATED WATER SOFTENING SYSTEM

BACKGROUND OF THE INVENTION

The invention relates to a method for operating a water softening system having an ion exchange device, comprising: an ion exchange resin, a supply vessel for supplying a regenerating solution for regenerating the ion exchange resin, an admixing device, and at least one flow meter, wherein an influent volume flow $V(t)_{raw}$ of raw water towards the water softening system is divided into a first partial volume flow and a second partial volume flow upstream of or within the water softening system, with the first partial volume flow being guided through the ion exchange resin and that softened partial volume flow $V(t)_{partial1soft}$ being admixed to the second, raw water-bearing partial volume flow $V(t)_{partial2raw}$, whereby in or downstream of the water softening system an effluent volume flow $V(t)_{admixed}$ of admixed water is formed, wherein the ratio between the first and second partial flow in the effluent volume flow $V(t)_{admixed}$ of the admixed water may be adjusted via the admixing device, wherein the method comprises the following steps:
 determining the conductivity of the raw water by means of a conductivity sensor, and determining therefrom the total hardness of the raw water using a calibration characteristic which is stored in a control unit,
 determining the first partial volume $V(t)_{partial1soft}$ directly or indirectly using the at least one flow meter.

A method of this kind is known from EP 0 900 765 B1.

If there is a requirement for softened or partially softened water due to technical reasons or reasons of convenience, water softening systems are used in different applications. In the softening according to the ion exchange method the hardness-forming ions, calcium and magnesium ions, are replaced with sodium ions. This is done by means of a resin (ion exchange resin) loaded with sodium ions. If the resin is depleted it has to be regenerated with salt brine, so as to be available for the softening process again.

The point in time when the ion exchange resin has matured to depletion and regeneration is imminent depends on the nominal capacity of the water softening system, on the water quality (i.e., the quality of the raw water), and on the water consumption. The major problem is to determine automatically and positively the appropriate point in time of regeneration independently of the water quality. if regeneration is started prematurely there will be a rise in salt consumption and thus the environment will be polluted, and if regeneration is started too late, there will be a hardness breakthrough.

One method to determine the point in time of regeneration of a water softening apparatus is known e.g., from DE 198 41 568 A1. Here, the electrical conductivity is measured upstream and downstream of the softening device and a difference of conductivity is ascertained therefrom. The disadvantage of this method, however, is that in the calcium/sodium exchange the conductivity undergoes minor changes only and, as a consequence, the point in time of regeneration cannot be determined exactly. Also, regeneration can only be initiated if an incomplete softening has already occurred, i.e., a hardness breakthrough has commenced.

Document U.S. Pat. No. 6,814,872 B2 describes an apparatus and a method for controlling regeneration of a water softener. For the purpose, the water hardness and the volume of the water to be softened are determined by means of a conductivity sensor or an ion-selective electrode and a water meter and the signals are outputted to an electronic controller. The point in time of regeneration is determined by making a comparison between a total level of hardness removed from the water so far and a water softener capacity. Ion-selective electrodes, however, are failure-prone and require regular maintenance efforts. Further, such electrodes are expensive.

Technical or economical reasons often make it necessary or desirous to only use partially softened water. It may occur that water which has been softened completely gives rise to corrosion problems whenever the formation of a protective coating is no longer possible in the downstream piping installation. Further, the capacity of the softener is rapidly depleted in the case of a complete softening, so early regeneration is necessary. This goes along with a high consumption of salt and does entail high expenditure. To implement partial softening, a device (admixing device) for the mixing of softened water (also known as pure water or soft water) and raw water is required. As a rule there is a desire for adjusting and controlling the water hardness in the admixed water, i.e., the admixture of softened water and raw water.

A device for water softening in accordance with the ion exchange method using an admixing device is described in EP 0 900 765 B1. For controlling the regenerating process of the ion exchanger and for admixing raw and pure water, the hardness of the influent raw water is determined by means of conductance sensors. Further, flow meters for pure and raw water plus additional conductance sensors are used in the ion exchange material, the signals of which are processed by an electronic evaluation and control unit. However, this known device has a relatively complex configuration due to the large number of electrodes required and thus is expensive, Moreover, adjusting the hardness of the admixed water using this device is rather inexact.

OBJECT OF THE INVENTION

The object of the present invention is to provide a method of the kind mentioned in the introduction which enables the point in time of regeneration of the ion exchange resin and the adjustment of the hardness of the admixed water to be determined with a high degree of precision and cost-effectiveness.

SUMMARY OF THE INVENTION

This object is achieved by a method of the kind mentioned in the beginning characterized in
that a total hardness I of the raw water which is used for controlling the regeneration process of the ion exchange resin is derived from the measured conductivity by means of a first calibration characteristic,
and a total hardness II of the raw water which is used for controlling the admixing device is derived from the measured conductivity by means of a second calibration characteristic.

For correctly controlling the regeneration and the admixing, the water hardness of the influent raw water has to be determined. However, the electrical conductance or the conductivity, respectively, only conditionally corresponds to the water hardness, i.e., to the calcium and magnesium content of the water. Rather, the conductance is a summation parameter covering the total of ions solved in water. The actual water hardness present in case of a specific conductivity may vary by several ° dH [Translator's note: ° dH German degrees; 1° dH=1.253° e (English degrees) or 1.78° fH (French degrees)]. If the water hardness gathered from the conductance exceeds the actual water hardness, regeneration is started prematurely, resulting in an increased consumption of salt, whereas a calculated water hardness which is below the actual water hardness, will lead to a regeneration which will be initiated too late, and thus to a hardness breakthrough. To prevent a hardness breakthrough, in the state of the art, as a rule, a water hardness is used in controlling the regeneration process which exceeds the actual water hardness. If this value is also used for controlling the admixing process, increased standard deviations with regard to the desired and actual admixed water hardness will ensue. In EP 0 900 765 B1 as well, a single hardness conductance is used for both controlling the regeneration of the ion exchanger and controlling the admixture of raw and pure water producing the said inaccuracies in the admixed water hardness.

In the method according to the invention the water hardness which is drawn upon in controlling the regeneration process, is determined from the measured conductivity by means of a first calibration characteristic, empirically derived from a multitude of water analyses. This first calibration characteristic (calibration curve) is defined such that the water hardness established from the said curve corresponds, at least in a good approximation, to the maximum water hardness occurring at this conductivity. This will prevent the regeneration process from being started too late such that a hardness breakthrough will be avoided reliably. Further, the consumption of regenerating salt will be only slightly higher than upon consideration of the actual water hardness present (which may be determined accurately only involving a large expenditure).

If this first calibration characteristic was also used for controlling the admixing device (or the portions of raw and soft water in the admixed water), then, in most cases, the water hardness in the raw water would be overrated and the actual water hardness in the admixed water would be lesser than pre-defined by the control. In other words, the deviation of the actual water hardness in the admixed water from the target value would be much higher than what would have been expected due to the variation of the water hardnesses in different compositions of potable water at an identical conductance.

In the method according to the invention, therefore, a second calibration characteristic (calibration curve) is used. The water hardness determined from the second calibration curve results from a data set of a multitude of water analyses as an average value of the total water hardnesses occurring in this conductivity (at least as a good approximation). This second curve makes it possible to obtain a higher conformity between the hardness of the raw water determined from the conductivity and the actual water hardness in the raw water. This allows to obtain a higher accuracy in the adjustment or controlling, respectively, of the water hardness in the admixed water. The standard deviation of the actual water hardness from the water hardness set as the target value of the admixture control essentially corresponds only to the variation resulting from the potential water hardnesses of different types of water at an identical electrical conductance.

Compared to the prior art a much more precise admixing operation is guaranteed due to the use of both calibration curves, wherein hardness breakthroughs will be reliably prevented at the same time. Within the scope of the invention, pre-defined tolerances concerning the hardness in the admixed water can easily be observed. It is not required to use expensive ion-selective electrodes; the method according to the invention only needs conventional summarized conductances.

In particular, the tolerances specified in the standard E DIN 19636-100, 2006-07 may be adhered to in an uncomplicated and cost-effective manner. The said standard defines: "The total of alkaline earth ions in the admixed water may not deviate from any set value by more than +0.4 mol/m$^3$ and −0.2 mol/m$^3$." If only the first calibration curve was used adherence to the standard would be impossible in most cases (in dependence of the range of fluctuation in the composition of the raw water).

The first partial volume flow $V(t)_{partial1soft}$ may be determined directly (by means of a flow meter in this partial volume flow) or indirectly (by means of flow meters in other volume flows from which measurement results the first partial volume flow may be derived). Within the scope of the present invention at least the first partial volume flow (to determine the point in time of regeneration), and preferably, also the second partial volume flow (for a more exact control of the composition of the admixed water) is determined. It should be noted that it will be sufficient for the determination of the two partial volume flows $V(t)_{partial1soft}$ and $V(t)_{partial2raw}$ to directly determine one of the two partial volume flows (which may be done in the first partial volume flow $V(t)_{partial1soft}$ both prior to and subsequent to the softening process) and, in addition, to determine either the influent (upstream) raw water volume flow $V(t)_{raw}$ or the effluent (downstream) admixed water volume flow $V(t)_{admixed}$, wherein, during the regular operation of the water softening system the following will apply: $V(t)_{raw} = V(t)_{admixed} = V(t)_{partial1soft} + V(t)_{partial2raw}$. The partial volume flow which is not determined directly, may then be calculated by subtraction (determining the partial volume flow indirectly). The letter t indicates the time.

The present invention may be used in particular to soften potable water, in particular in domestic water supply systems. A water softening system which is operated in accordance with the invention may be connected to a domestic waster supply system without major installation efforts and be operated instantly. The water softening system automatically adjusts to the composition of the local water by means of the conductivity measurement, wherein, due to the two calibration characteristics, a good assessment of the hardness both for the automatic regeneration control and for the automatic control of the admixing device are achieved. Further manual settings (e.g. for calibration) will not be required.

Preferred Variants of the Invention

In an especially preferred variant of the method according to the invention it is provided that the total hardness I derived from the first calibration characteristic is at least section-wise larger than the total hardness II derived from the second calibration characteristic. This constellation of calibration characteristics avoids both an underestimation of the hardness of the raw water with a view to the regeneration of the ion exchange resin and also a methodical overestimation of the hardness for admixture control. In other words, on the one hand regeneration in good time is ensured whereas on the other hand the desired hardness of the admixed water may be maintained for any raw water with greater ease within tight tolerances. The use of two different total hardnesses I and II takes into account the different pre-defined tolerances for the regeneration and the admixture process. In the admixture process, a deviation below and above the set value is admitted, whereas only a premature, but, not a belated start is admissible when regeneration is triggered off.

A variant of the method is also preferred in which the first calibration characteristic uses a conversion factor of 28-35 μS/cm per °dH, in particular of 30-33 μS/cm per °dH. Based on these values, a safe and equally salt-saving conversion of the conductance to the water hardness for numerous variations in the composition of local potable water is performed. The evaluation of the analysis of some 300 different kinds of potable water has revealed that upon use of a conversion factor of 28-35 µS/cm per °dH*, in particular of 30-33 µS/cm per °dH, the calculated water hardness represents an upper limit of the spectrum of water hardnesses actually occurring at that conductance. On the one hand a timely start of the regeneration process is thus ensured, on the other hand, no premature regeneration does occur such that the minimum exchange capacity of 4 mol (400 g $CaCO_3$) per kilogram of regenerating salt employed, as prescribed by the DIN EN 14743 standard, will be exceeded without difficulty.

Also preferred is a variant of the method according to which the second calibration characteristics uses a conversion factor of 35-44 µS/cm per °dH, in particular of 38-41 µS/cm per °dH. Based on these values, quite an exact conversion of the conductance to the water hardness for numerous variations in the composition of local potable water is performed. As the evaluation of the analyses of the said some 300 different kinds of potable water reveals, the water hardnesses calculated using that second conversion factor as a basis, are within the mean area of the spectrum of water hardnesses actually occurring at that conductance. Whenever a raw water hardness calculated in this way is used for controlling the admixture of raw water and softened water, the actual hardness of admixed water easily will be within the tolerances specified by the E DIN 19636-100, 2006-07 standard.

In a particularly preferred variant of the method it is proposed that the electronic control unit initiates triggering the regeneration process on the basis of the total raw water hardness I derived from the first calibration characteristic, the amount of raw water having flown through the ion exchange resin (i.e., the amount of softened water of integral partial volume flow $V(t)_{partial1soft}$) and a capacity of the ion exchange resin stored in the control unit. By comparing the number of the exchanged hardness formers gathered from the hardness and amount of raw water with the specific system capacity, a timely and automatic initiation of the regeneration of the depleted resin is generated.

In a preferred variant of the method it is provided that controlling of the admixing device is done only on the basis of the total hardness II of the raw water derived from the second calibration characteristic and the pre-defined admixing water hardness. In this variant, the ratio of the two partial volume flows in the admixed water during normal operations of the water softening system is deduced only on the basis of the setting of the admixing device (for this purpose, the ratios of the partial volume flows resulting from the different settings of the admixing device have to be predetermined and stored in the electronic control unit); there is no feedback concerning the setting of the admixing device by determining both partial volume flows during normal operations. This significantly simplifies the control of the admixture process. In the case of the pressure conditions on the influent and effluent side of the water softening system being constant, the admixture process is sufficiently accurate for most applications. This control variant may also be used transitionally at the onset of operations of the water softening system as long as measured values for both partial volume flows for providing feedback are not yet available.

In an alternative, particularly preferred variant of the method it is provided that the water softening system has at least two flow meters, that the first partial volume flow $V(t)_{partial1soft}$ and the second partial volume flow $V(t)_{partial2raw}$ are determined directly or indirectly using the at least two flow meters (13, 14, 17), and that the admixing device is controlled on the basis of the total raw water hardness II derived from the second calibration characteristic and a pre-defined admixing water hardness in a feedback process with the specific partial volume flows $V(t)_{partial1soft}$ and $V(t)_{partial2raw}$. In this variant, the partial volume flows during normal operations of the water softening device are monitored (measured/determined) continuously, and the adjustment setting of the admixing device is automatically trailed such that the ratios of the partial volume flows in the admixed water are always in compliance with the specification resulting from the measured raw water hardness (in accordance with total hardness II) and the pre-defined hardness of the admixed water. This allows to compensate for the fluctuations in the ratios of the partial volume flows in the admixed water possibly resulting from fluctuations due to external constraints (such as the pressure of influent raw water or the magnitude of the effluent volume flow of admixed water) with the setting of the admixture device being identical, and the hardness of the admixed water in normal operations adheres to the set value with high fidelity. If the hardness of the raw water is known, an arbitrary hardness of admixed water between 0° dH and the hardness of the raw water may be set by controlling the volume flows of softened water and admixed raw water. E.g., the raw water may be admixed to the softened water via a bypass pipe. The hardness of the raw water has to be known exactly in order to set the hardness of the admixed water with accuracy. The actual hardness of the raw water deviates from the total hardness II of the raw water derived from the second calibration characteristic to a very minor extent only, such that the hardness of the admixed water hardly deviates from the set value.

In a preferred variant of the method the conductivity of the regenerating solution is determined by means of a further conductivity sensor. This may be done, e.g., in the regenerating solution feed pipe to the resin beds during the regeneration process. This allows verification of the sufficiency of the salt concentration in the regenerating solution for regeneration. If the required salt concentration is not attained, e.g. due to a lack of salt or when the salt has not dissolved completely in the brine, merely an incomplete regeneration of the resin is achieved. By monitoring the brine concentration by means of a conductivity measurement, an incomplete regeneration and a consequentially ensuing hardness breakthrough is prevented. It is preferred to indicate an insufficient salt concentration by means of an optical or acoustic signalling device.

The present invention also encompasses a water softening system having an ion exchange device, comprising an ion exchange resin, a supply vessel for supplying a regenerating solution for regenerating the ion exchange resin, and an admixing device for mixing of raw water and softened water, a conductivity sensor for measuring the conductivity of the raw water, at least one, preferably two, flow meters and an electronic control unit, characterized in that the electronic control unit has a memory having a multitude of calibration characteristics stored therein for determining the total hardness of the raw water from the conductivity thereof. When storing multiple calibration characteristics, the fact that the conductivity represents a summation parameter covering all of the ions which have been dissolved in the water is accounted for, whereas the hardness of the water merely depends on the sum of calcium and magnesium ions, for example. Thus the conductivity present at a specific water hardness will vary depending on which ions are present in the water besides the calcium and magnesium ions. For example, if the proportion of mono-ions, such as sodium or potassium, is high, then a concomitantly high conductivity, will also ensue, although the total hardness, i.e. the content of calcium and magnesium ions may be low. On the other hand, water with a low sodium content having a high content of calcium and magnesium ions may well posses a high water hardness despite its having a relatively low conductivity. This means that the water hardness present at a specific conductivity is within a specific interval. This interval is taken into account by the two calibration characteristics. This enables regeneration and admixture to be correctly controlled. The water softening device according to the invention is particularly suited for the inventive operating method referenced hereinabove.

In a preferred embodiment of the water softening system according to the invention there is provided that the conductivity sensor, at least one flow meter and/or the admixing device are arranged in a fitting adapter for mounting the water softening system to a water net piping. The fitting adapter includes ducts for the entire influent raw water and the effluent (partially) softened admixed water and may be connected to any adaptor that is already available. There is no need for a separate fitting. This is why the installation is space-saving, simple, and cost-efficient.

In another preferred embodiment there is provided that the conductivity sensor, at least one flow meter and/or the admixing device are arranged in a control head of the water softening system. This embodiment enables a particularly compact and cost-effective construction.

Also preferred is an embodiment wherein a bypass pipe is provided in which are arranged the admixing device and a flow meter for the second partial volume flow $V(t)_{partial2raw}$ of the raw water used for admixing. Bypass pipes of this kind enable the softening system to be constructed in a simple mode. Further, the dosing of substances via the bypass pipe, such as corrosion protection agents for further water treatment, is feasible. The bypass pipe runs parallel to the pipeline in which the ion exchange device is contained.

In an especially preferred embodiment there is provided that the admixing device comprises an admixing valve, in particular a bypass valve, and an actuating motor which is driven by the electronic control unit. The actuating motor allows for a good automatic driving of the admixing valve. An admixing device which includes a bypass valve enables by simple means to obtain any mixing ratio between raw water and softened water by partially opening or closing the bypass valve, respectively.

In a further preferred embodiment, a further conductivity sensor is arranged so as to contact the regenerating solution. For example, this may occur in the regenerating solution feeder line upstream the resin bed or in the brine vessel itself. This allows to monitor the concentration of the brine during the regeneration of the ion exchanger. Whenever the salt concentration, e.g., due to the lack of salt or because the dissolution time is too short, the ion exchange resin cannot be regenerated completely, such that a premature hardness breakthrough does occur. This will be prevented by monitoring the brine concentration by means of a conductivity sensor. Further, it is preferred to provide an acoustic or optical signal device which will indicate that the concentration of the regenerating solution is too low.

Further advantages of the invention will be apparent from the description and the drawing(s). Moreover, the features in accordance with the invention mentioned hereinabove and described in more detail may be implemented in accordance with the invention individually or in any desired combination. It should be appreciated that the embodiments described and shown are not to be considered as limiting but are rather of exemplary character for the description of the invention.

DETAILED DESCRIPTION OF THE INVENTION AND DRAWING

Figure 2:
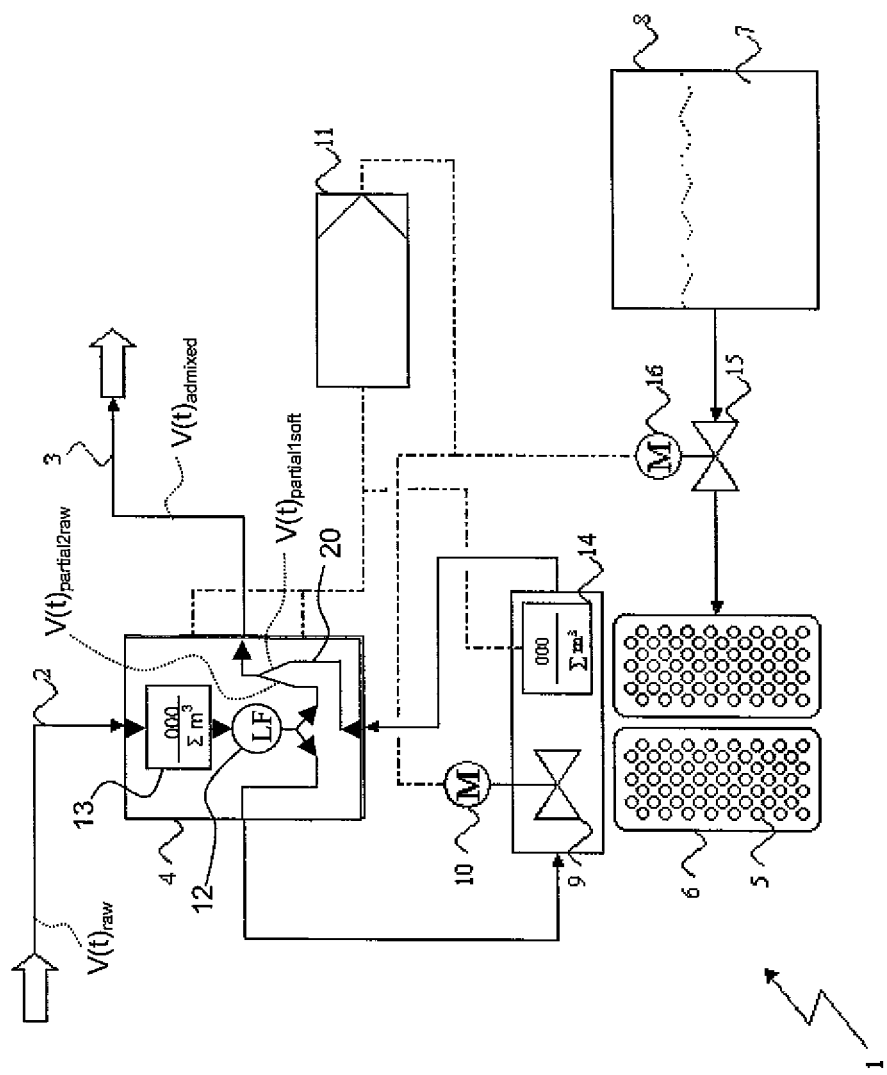
Figure 3:
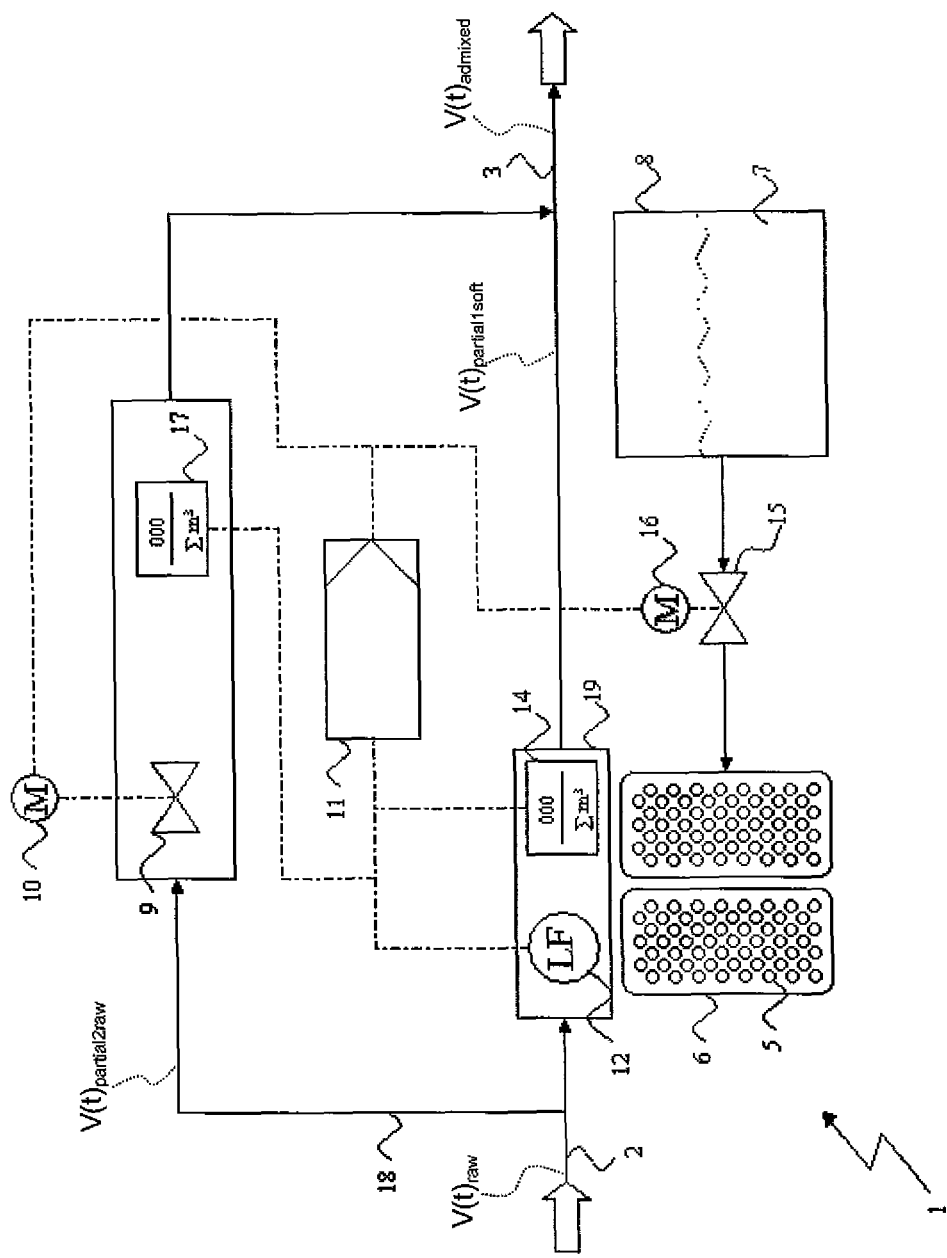

The invention is shown in the drawing and will be explained in detail using exemplary embodiments. In the drawings:

FIG. 1 shows a diagrammatical illustration of the titrimetrically determined total hardness in dependence of the measured conductivity in different potable waters;

FIG. 2: the schematic structure of a first embodiment of a water softening system in accordance with the invention;

FIG. 3: the schematic structure of a second embodiment of a water softening system in accordance with the invention.

The present invention is concerned with the problem to determine the water hardness for water, in particular potable water or domestic water, such that on the one hand the regeneration of an ion exchanger and on the other hand the adjustment of the water hardness in admixed water (a mixture of raw and softened water) in a water softening system is performed with high accuracy. A simple option to estimate the hardness of raw water is to measure the electric conductivity of the raw water.

With regard to the illustration in FIG. 1 approx. 300 different potable waters in the Federal Republic of Germany were analyzed and the conductivity thereof was determined as well as the total hardness. The conductivity was measured using a conductometer whereas the overall hardness was determined titrimetrically.

In contrast to the titrimetrical determination method, the determination of the total hardness based upon a conductivity measurement may be performed rapidly and easily and is therefore widely used in controlling water softening systems. However, in FIG. 1 one recognizes that waters found to have conductivity, e.g. of 625 µS/cm, show a total hardness of about between 14° dH and 20° dH. In general, no deduction can be made from the electrical conductivity of water to an exact hardness value, but only to a region in which the water hardness will be found actually. The variation of the water hardness in dependence of the conductivity may be determined by taking samples. Within the scope of the present invention, for a proposed region of use of a water softening system, such as the Federal Republic of Germany in the latter case, this variation is typically determined in advance.

To prevent the occurrence of a hardness breakthrough in a water softening system, the regeneration process of the depleted ion exchange resin has to be initiated in due time. Therefore, the total hardness I gathered from the measured conductivity, which is drawn upon in controlling the regeneration process, may not be smaller than the largest total hardness determined titrimetrically at this conductivity, i.e., the largest total hardness occurring in practice. Only in this way it may be guaranteed that regeneration will be initiated in due time for any arbitrary water composition. This is the reason why the total hardness I for regeneration control is determined from the measured conductivity by means of first calibration characteristic F1. That first calibration characteristic F1 (at least in good approximation) reflects the maximum total hardness occurring in dependence of the conductivity; here (in FIG. 1) F1 has a slope of about 31 µS/cm° dH and is a line through origin.

To prevent a hardness breakthrough a calibration characteristic having an even lower slope than F1 could be used though; in this case, however, regeneration salt would be wasted. The applicable standard for softeners is DIN EN 14743 which provides that at least an exchange capacity of 4 mol (400 g $CaCO_3$) has to be achieved per kilogram for the salt used in regeneration, thus limiting the salt consumption.

It is therefore preferred within the scope of the invention not to use a calibration characteristic for determining the total hardness the slope of which is significantly below that of F1. This ensures that the requirements of DIN EN 14742 with regard to salination may be met properly.

Due to health, technical or economic reasons it is frequently required to use water which is only partially softened. This necessitates a device for mixing softened water with raw water. As a rule, a user is desirous of adhering to a specific target value in terms of water hardness with certain tolerances applying for the admixed water. E DIN 19636-100, 2006-07 additionally provides for maximum tolerances, e.g., that the total of the alkaline earth ions in the admixed water in case of different volume flows and a target value of 8° dH may not deviate by more than +0.4 mol/m$^3$ and −0.2 mol/m$^3$ therefrom. With this set value of 8° dH the actual value in the admixed water has to be between 6.9° dH and 10.2° dH.

In order to be able to adhere to tolerances in the hardness of admixed water as tight as possible the invention provides to determine the total hardness II for controlling the admixing device from the measured conductivity of the raw water by means of a second calibration characteristic F2. The second calibration characteristic F2 reflects the averaged total hardness in dependence of the conductivity (at least in good approximation). Here, (in FIG. 1) calibration characteristic F2 has a slope of about 39 μS/cm° dH and is a line through origin as well.

Based on the second calibration characteristic F2, a total hardness II of 16° dH is determined in case of a measured conductivity of 625 μS/cm. FIG. 1 shows that waters the conductivity of which was determined at 625 μS/cm exhibit a total hardness between about 14° dH and 20° dH. The lower limit is defined by line F3 having a slope of about 46 μS/cm° dH, whereas the calibration characteristic F1 reflects die maximum total hardness I in dependence of the conductivity. To achieve a given hardness of the admixed water of, e.g., 8° dH, the raw water has to be mixed with softened water in the ratio 1:1. In case of the raw water having 14° dH, the same admixture produces a hardness of admixed water of 7° dH, whereas such an admixing process of raw water and softened water will result in a hardness of the admixed water of 10° dH if the raw water hardness is 20° dH. If the hardness of the mixed water is set to be 8° dH, the effective mixed water hardness thus is 7° dH to 10° dH. The specification of standard E DIN 19636-100, 2006-07 with regard to the admixing device is thus complied with in any case if for determining the total hardness II from the conductivity the calibration characteristic F2 is drawn upon.

If the total hardness I of 20° dH determined at 625 μS/cm on the basis of calibration characteristic F1 was used for controlling the admixing process, one ought to mix the raw water with softened water in the ratio 1:1.5 in order to obtain a hardness of the admixed water of 8° dH. With the hardness of the raw water being 14° dH, the same mixture ratio would produce a hardness of the admixed water of 5.6° dH. This is in excess of the pre-defined tolerances. This is the reason why calibration characteristic F1, which is used for regeneration control, is not suited for controlling the admixing device.

The use of two different total hardnesses I and II does take into consideration the different pre-defined tolerances in controlling the regeneration and admixture processes. As far as the admixture process is concerned, both an upward and a downward deviation from the set value is permissible, whereas in determining the trigger point for regeneration only a premature start is admissible, however not a belated one.

The values for total hardnesses I and II are hypothetic, faulty due to the divergent portion of mono-ions such as sodium and potassium in different waters. Disparate fault tolerances are admitted/used in connection with the two calibration characteristics F1 and F2.

It should be considered that in the example shown the calibration characteristics F1 and F2 do run as straight lines such that the mathematical description of the calibration characteristics is easy. In principle, non-linear calibration characteristics for determining the total hardnesses I and II are also conceivable in accordance with the invention, e.g., approximated as polynominal functions.

FIG. 2 shows a schematic configuration of a first embodiment of the water softening system 1 according to the invention, having an inlet 2 for influent raw water and an outlet 3 for effluent softened or partially softened water, a fitting adapter 4 for mounting an ion exchange device 6 loaded with an ion exchange resin 5 to a water net piping, and having a vessel 8 loaded with brine (regenerating solution) 7 for regenerating depleted ion exchange resin 5. Partially softened water obtained by mixing raw water and softened water is provided by means of an admixing valve 9, which is driven by an actuating motor 10. An electronic control device 11 receives signals emitted by a conductivity sensor 12 arranged in the raw water zone in the fitting adaptor 4, by a water meter (flow meter) 13 for the total influent raw water volume flow $V(t)_{raw}$ which is arranged there as well, and by a water meter 14, measuring the volume flow (first partial volume flow) of softened water $V(t)_{partial1soft}$. The water meters 13, 14 do measure the current volume flow (present in time t) and add the water volume by means of the electronic control device. In the electronic control device 11 both calibration characteristics F1 and F2 are stored, which are used each to determine a value indicating the total hardness of the raw water.

The total hardness I calculated on the basis of calibration characteristic F1 and the amount of water measured by means of water meter 14, which has flown through ion exchange device 6, are used for controlling the regeneration of ion exchange resin 5. In this process, when the state of depletion of ion exchange resin 5 is reached, a valve 15 is driven by means of a motor 16 such that brine may flow into the ion exchange device 6 and ion exchange resin 5 is regenerated (During the regeneration, the normal water flow through ion exchange resins should be stopped; however, in the interim, the water flow may be guided through an additional vessel loaded with ion exchange resin (so-called "swing operation"). Within the scope of the invention ion exchange device 6 preferably has two vessels loaded with ion exchange resin 5 for the said swing operation).

For admixture control purposes the total hardness II is calculated using calibration characteristic F2 which is stored in the electronic control device. The current second partial volume flow $V(t)_{partial2raw}$ having non-softened raw water which is fed into the admixed water volume flow $V(t)_{admixed}$ is calculated in control device 11, by determining the difference between the current volume flows $V(t)_{raw}$ and $V(t)_{partial1soft}$. The proportions of admixed water of $V(t)_{partial2raw}$ and $V(t)_{partial1soft}$ are pre-defined by the hardness of the raw water and the hardness of the admixed water, and are stored in the electronic control device 11 or calculated by the latter. Admixing valve 9 is driven via actuating motor 10 in accordance with the desired hardness in the admixed water. Water meter 13 in the raw water region and water meter 14, measuring the partial volume flow of softened water, serve for monitoring (in particular feedback) purposes. In piping section 20, guiding the first partial volume flow $V(t)_{partial1soft}$, a check valve (not shown) may be provided in order to prevent raw water from flowing into the outlet of ion exchange device 6.

In the embodiment of the invention of FIG. 1, individual components such as conductivity sensor 12 and water meter 13 are arranged in fitting adapter 4. A fitting adapter 4 of this type may be connected to an arbitrary adapter which is already in situ. A separate connection will not be required. Due to this, installation into the inventive system 1 saves space, is simply and cost-efficient.

It is also possible to arrange the individual components of water softening system 1 in a different manner.

FIG. 3 shows another embodiment of a water softening system according to the invention. Explanations are provided with a view to significant modifications as compared to the preceding embodiment only.

In the embodiment according to FIG. 3, the admixing valve 9 and one water meter (flow meter) 17 are arranged in a bypass pipe 18 leading to ion exchange device 6. Water meter 17 directly registers the partial volume flow $V(t)_{partial2raw}$ which will be admixed to the softened water $V(t)_{partial1soft}$. The signals are forwarded to electronic control device 11 which drives admixing valve 9 via actuating motor 10 in accordance with the pre-defined hardness of the admixed water. Electronic control device 11 may be integrated in a control head 19 of the ion exchange device 6 or may be arranged externally. In this exemplary embodiment, conductivity sensor 12 for measuring the conductivity of the raw water and water meter 14 measuring the amount of softened water (i.e., $V(t)_{partial1soft}$) are also positioned in control head 19 (with the conductivity measurement being made prior to softening). Moreover, in electronic control device 11 there are stored two different calibration characteristics F1 and F2 for determining the total hardness of the raw water from the conductivity measured by means of sensitivity sensor 12.

In summary, the invention proposes to provide two different conversion modes for determining the water hardness on the basis of the conductivity of raw water in a water softening device (1) dividing influent raw water volume flow $V(t)_{raw}$ into two partial volume flows $V(t)_{partial1soft}$, $V(t)_{partial2raw}$, subjecting a partial volume flow $V(t)_{partial1soft}$ to a full softening process and re-uniting the two partial volume flows thereafter again into an admixed water volume flow $V(t)_{admixed}$. Conversion using a first calibration curve (F1) is conservative and reflects the maximum water hardnesses occurring at different conductivities; this conversion mode is used for automatically controlling the regeneration of an ion exchange resin (5), with the capacity of the ion exchange resin being known. The conversion using a second calibration curve (F2) is close to reality and reflects the average water hardnesses (i.e., the hardnesses subject to the least statistical errors) at different conductivities; this conversion mode is used for controlling the admixing device (i.e. the ratios of the two partial volume flows in the admixed water). On the basis of the invention, experimentally found variations in the composition of water (and thus different correlations between conductivity and water hardness) may be taken into account in order to determine the optimal point in time of regeneration and to minimize the tolerances concerning the hardness of admixed water against a set value.

List of References

1 Water softening system
2 Inlet for raw water
3 Outlet for (partially) softened admixed water
4 Fitting adapter
5 Ion exchange resin
6 Ion exchange device
7 Brine (regenerating solution)
8 Brine vessel (supply vessel)
9 Admixing valve
10 Actuating motor
11 electronic control device
12 Conductivity sensor
13 Water meter for raw water (total of influent raw water)
14 Water meter for softened water (first partial volume flow)
15 Valve
16 Actuating motor
17 Water meter for raw water (second partial volume flow)
18 Bypass pipe
19 Control head
20 Pipe section

The invention claimed is:

1. A method for operating a water softening system having an ion exchange device, comprising:
   an ion exchange resin, a supply vessel for supplying a regenerating solution for regenerating the ion exchange resin, an admixing device, and at least one flow meter,
   wherein an influent volume flow $V(t)_{raw}$ of raw water towards the water softening system is divided into a first partial volume flow and a second partial volume flow upstream of or within the water softening system, with the first partial volume flow being guided through the ion exchange resin and that softened partial volume flow $V(t)_{partial1soft}$ being admixed to the second, raw water-bearing partial volume flow $V(t)_{partial2raw}$, whereby in or downstream of the water softening system an effluent volume flow $V(t)_{admixed}$ of admixed water is formed,
   wherein the ratio between the first and second partial volume flow in the effluent volume flow $V(t)_{admixed}$ of the admixed water may be adjusted via the admixing device
   the method comprising:
   determining the conductivity of the raw water by means of a conductivity sensor, and determining therefrom the total hardness of the raw water using a calibration characteristic stored in an electric control unit,
   determining the first partial volume flow $V(t)_{partial1soft}$ directly or indirectly using the at least one flow meter,
   deriving a total hardness I of the raw water which is used for controlling the regeneration process of the ion exchange resin from the measured conductivity of the raw water by means of a first calibration characteristic, wherein the first calibration characteristic is used to control the regeneration process,
   deriving a total hardness II of the raw water used for controlling the admixing device from the measured conductivity of the raw water by means of a second calibration characteristic, wherein the second calibration characteristic is used to control the admixing device, wherein the second calibration characteristic is different from the first calibration characteristic and wherein the total hardness I derived from the first calibration characteristic is at least section-wise larger than the total hardness II derived from the second calibration characteristic.

2. The method according to claim 1, wherein the first calibration characteristic uses a conversion factor of 28-35 μS/cm per ° dH.

3. The method according to claim 1 wherein characterized in that the second calibration characteristic uses a conversion factor of 35-44 μS/cm per ° dH.

4. The method according to claim 1 wherein the electronic control unit initiates triggering of the regeneration process on the basis of the total raw water hardness I derived from the first calibration characteristic, the amount of raw water having flown through the ion exchange resin and a capacity of the ion exchange resin stored in the control unit.

5. The method according to claim 1 wherein controlling the admixing device is done only on the basis of the total hardness II of the raw water derived from the second calibration characteristic and the pre-defined admixing water hardness.

6. The method according to claim 1 wherein the water softening system has at least two flow meters, that the first partial volume flow $V(t)_{partial1soft}$ and the second partial volume flow $V(t)_{partial2raw}$ are determined directly or indirectly using the at least two flow meters, and that the admixing device is controlled on the basis of the total raw water hardness II derived from the second calibration characteristic and a pre-defined admixing water hardness in a feedback process with the specific partial volume flows $V(t)_{partial1soft}$ and $V(t)_{partial2raw}$.

7. The method according to claim 1 wherein the conductivity of the regenerating solution is determined by means of a further conductivity sensor.

8. A water softening system comprising:
   an ion exchange device loaded with an ion exchange resin
   a supply vessel for supplying a regenerating solution for regenerating the ion exchange resin;
   an admixing device for mixing of raw water and softened water;
   a conductivity sensor for measuring the conductivity of the raw water; at least one flow meter; and
   an electronic control unit, the electronic control unit including a memory having a multitude of calibration characteristics stored therein, wherein by means of a first calibration characteristic a first total hardness I of the raw water and by means of a second calibration characteristic a second total hardness II of the raw water may be determined from the conductivity of the raw water, wherein the first calibration characteristic is different from the second calibration characteristic and the total hardness I derived from the first calibration characteristic is at least section-wise larger than the total hardness II derived from the second calibration characteristic, wherein the first calibration characteristic is used to control the supplying of the regeneration solution and the second calibration characteristic is used to control the admixing device.

9. The water softening system in accordance with claim 8, wherein the conductivity sensor, at least one flow meter and/or the admixing device are arranged in a fitting adapter for mounting the water softening system to a water net piping.

10. The water softening system in accordance with claim 8 wherein the conductivity sensor, at least one flow meter and/or the admixing device are arranged in a control head of the water softening system.

11. The water softening system in accordance with claim 8 further comprising a bypass pipe and the admixing device and a flow meter, for the second partial volume flow $V(t)_{partial2raw}$ of the raw water used for admixing, are disposed in the bypass pipe.

12. The water softening system in accordance with claim 8 wherein the admixing device comprises an admixing valve, and an actuating motor driven by the electronic control unit.

13. The water softening system in accordance with claim 8 further comprising another conductivity sensor arranged for contacting the regeneration solution.

* * * * *

UNITED STATES PATENT AND TRADEMARK OFFICE
CERTIFICATE OF CORRECTION

PATENT NO.      : 8,773,149 B2
APPLICATION NO. : 12/744918
DATED           : July 8, 2014
INVENTOR(S)     : Ralf Soecknick et al.

Page 1 of 1

It is certified that error appears in the above-identified patent and that said Letters Patent is hereby corrected as shown below:

On the Title Page, item (56), in the References Cited, Page 2, under Foreign Patent Documents, "DE 10 2005 035 951 A1" should be changed to --DE 10 2005 035 950 A1--.

Signed and Sealed this
Seventh Day of October, 2014

Michelle K. Lee
*Deputy Director of the United States Patent and Trademark Office*